United States Patent [19]
Unno et al.

[11] 3,761,146
[45] Sept. 25, 1973

[54] FLUID BEARING

[75] Inventors: Kunihiko Unno, Kariya; Kazuhiko Sugita, Anjo, both of Japan

[73] Assignee: Toyoda Koki Kabushiki Kaisha, Kariya-shi, Aichi-ken, Japan

[22] Filed: Oct. 26, 1971

[21] Appl. No.: 192,223

[52] U.S. Cl. .................................................... 308/9
[51] Int. Cl. ............................................. F16c 17/16
[58] Field of Search ......................... 308/9, 1 V, 1 A

[56] References Cited
UNITED STATES PATENTS
2,692,803   10/1954   Gerard................................... 308/9

*Primary Examiner*—Charles J. Myhre
*Assistant Examiner*—Frank Susko
*Attorney*—E. F. Wenderoth et al.

[57] ABSTRACT

In a fluid bearing comprising a bearing member adapted to rotatably support a shaft by means of a thin fluid film which is formed by supplying fluid under pressure into a small gap between the shaft and the bearing member and a control valve including a cylinder and a spool slidably received in the cylinder for controlling the pressure of the fluid, the bearing surface of the bearing member is provided with a plurality of control pockets and a plurality of detection pockets respectively surrounding the control pockets, the fluid is supplied under a predetermined pressure to the control pockets and the detection pockets, a pair of diametrically opposite detection pockets are connected to the opposite ends of the control valve for operating the spool, a pair of diametrically opposite control pockets respectively surrounded by the pair of diametrically opposite detection pockets are connected to the output of the control valve whereby upon creation of a pressure differential between the pair of detection pockets due to application of a load on the shaft, the fluid pressure in one of the pair of control pockets is increased whereas the fluid pressure in the other is decreased and wherein the control valve is balanced in accordance with the pressure differentials between the pair of detection pockets and between the pair of control pockets so that the pressure differentials are created between the pair of control pockets and the pair of detection pockets for restoring the shaft to the center of the bearing against the load. The spool is provided with a plurality of fluid passages inclined in the same direction with respect to the radius so that the fluid flowing through the passages creates a force tending to rotate the spool.

4 Claims, 4 Drawing Figures

FLUID BEARING

BACKGROUND OF THE INVENTION

This invention relates to a fluid bearing for rotatably supporting a shaft through a fluid film formed in a small gap between the bearing member and the shaft by supplying fluid under pressure to pockets formed in the bearing member.

In a conventional fluid bearing, the bearing surface adapted rotatably support a shaft is provided with a plurality of pockets which are surrounded by a plurality of lands divided by discharge grooves and fluid under pressure is supplied to these pockets through fixed or nonadgustable orifices. The pressurized fluid is discharged to the discharge grooves through small gaps defined between the outer peripheral surface of the shaft and the lands to maintain a constant fluid pressure in respective pockets. Upon application of a load upon the shaft, the shaft is displaced to vary the gaps between it and the lands so that the pressure in one pocket is increased whereas the pressure in the diametrically opposite pocket is decreased and the pressure differential between these pockets acts to support the load. The stiffness of this type of fluid bearing is not sufficiently high because constant pressure fluid is supplied to the bearing through fixed orifices so as to cause to vary the pressure in the pockets in response to the variation in the gap between the shaft and the lands.

To obviate this difficulty it has been proposed to provide a plurality of independent detection pockets of the same number as the control pockets adjacent thereto and communicated therewith through discharge grooves. The pressure differential in opposed detection pockets is used to operate a control spool or a slide valve to change the openings of variable orifices connected between a source of fluid pressure and the control pockets so as to vary the pressure in the control pockets in accordance with the pressure variation caused by the displacement of the shaft in the small gaps between the shaft and the lands and with the pressure variation caused by the adjustment of the variable orifice. With this arrangement it is possible to rapidly create a large pressure differential between the opposed control pockets to resist the displacement of the shaft. Such an arrangement is disclosed in U.S. Pat. No. 2,692,803, dated Oct. 26, 1954.

In the bearing disclosed in this patent, the pressure differential in the detection pockets is not influenced by the pressure variation produced by the adjustment of the variable orifices but influenced only by the pressure variation caused by the displacement of the shaft in the gap between the peripheral surface thereof and the lands with the result that the effective area subjected to the pressure variation caused by the adjustment of the variable orifices becomes smaller than the total bearing area, thus limiting the stiffness of the fluid bearing.

Further, a conventional control valve utilized to provide above described function comprises a cylinder and a spool disposed therein to be slidable in the axial direction. However, the fluid supplied to the bearing and to the control valve usually consists of bearing oil having a certain degree of viscosity, so that the axial movement of the spool is affected by the viscosity or static friction of the bearing oil. Further as it is necessary to operate the control valve in response to a relatively small pressure differential in the bearing oil in the control pocket and detection pocket in order to improve the response of the control valve the spool should move quickly and smoothly. But since the ordinary bearing oil has some visocity and viscosity the viscosity varies with ambient temperature, the movement of the spool becomes intermittently which is called as a stick slip phenomenon.

SUMMARY OF THE INVENTION

It is therefore an object of this invention to provide an improved fluid bearing of high stiffness which can quickly bring back the shaft to the center of the bearing when a load is applied to the shaft.

Another object of this invention is to provide an improved fluid bearing of the type including a control pocket and a detection pocket wherein the shaft is quickly brought back to the center of the bearing when a load is applied to the shaft and wherein the pressure variation in the detection pocket created by the control valve remains even after the shaft has been brought back to the center of the bearing against the load thus improving the load carrying capacity of the bearing.

Still another object of this invention is to provide an improved control valve for the fluid bearing of the type referred to above wherein the operation of the control valve is not affected by the viscosity of the bearing oil.

According to this invention there is provided a fluid bearing of the type comprising a bearing member adapted to rotatably support a shaft by means of a thin fluid film which is formed by applying fluid under pressure into a small gap between the shaft and the bearing member and a control valve including a cylinder and a spool slidably received in the cylinder for controlling the pressure of the fluid, characterized in that the bearing surface of the bearing member is provided with a plurality of control pockets and a plurality of detection pockets respectively surrounding the control pockets, that the fluid is supplied under a predetermined pressure to the control pockets and the detection pockets, that a pair of diametrically opposite detection pockets are connected to the opposite ends of the control valve for operating the spool, that a pair of diametrically opposite control pockets respectively surrounded by the pair of diametrically opposite detection pockets are connected to the output of the control valve whereby upon creation of a pressure differential between the pair of detection pockets due to application of a load on the shaft, the fluid pressure in one of the pair of control pockets is increased whereas the fluid pressure in the other control pocket is decreased, and that the control valve is balnced in accordance with the pressure differentials between the pair of detection pockets and between the pair of control pockets so that pressure differentials are created between the pair of control pockets and the pair of detection pockets for restoring the shaft to the center of the bearing against the load.

More particularly, the control valve comprises a cylinder, a hollow spool slidably received in the bore of the cylinder, and an annular chamber provided for the bore to surround the spool, the spool being provided with a plurality of inclined passages which are contained in a plane perpendicular to the axis of the spool and inclined in the same direction with respect to the radius thereof whereby the fluid flowing through the inclined passages creates a force for rotating the spool. Further, the spool is provided with a flange projecting into the annular chamber with small clearances therebetween so as to form variable orifices between the side walls of the annular chamber and the side walls of the flange. These orifices are communicated respectively with a pair of diametrically opposite control pockets and a pair of detection pockets encircling these control pockets and the degree of opening of the variable orifices is controlled in accordance with the axial movement of the spool.

BRIEF DESCRIPTION OF THE DRAWINGS

The invention can be more fully understood from the following detailed description of a preferred embodiment taken in conjunction with the accompanying drawings in which.

DESCRIPTION OF THE PREFERRED EMBODIMENT

Figure 1:
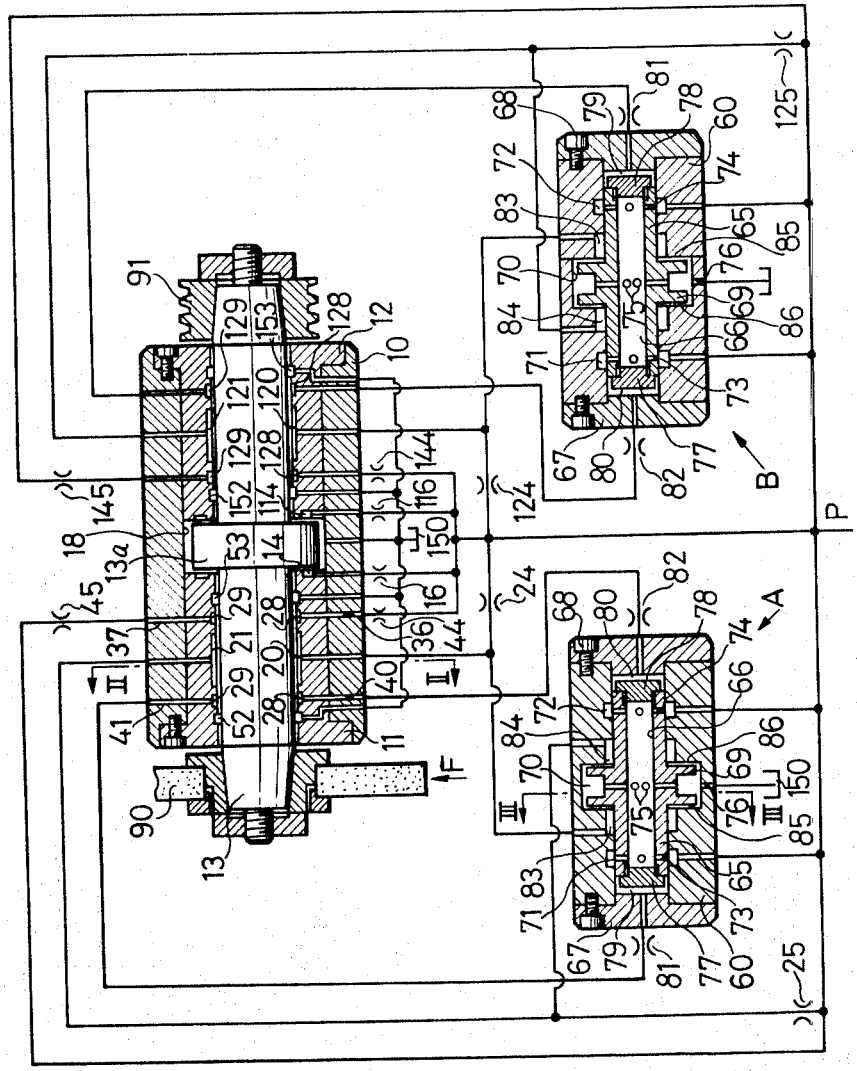
FIG. 1 shows longitudinal sections of a fluid bearing and control valves embodying the invention.

Fluid bearing 10 shown in FIG. 1 comprises a pair of bearing sleeves 11 and 12 which are secured in bearing 10 to oppose each other to define a chamber 18 therebetween. Within sleeves 11 and 12 is rotatably mounted a shaft 13 having an enlarged portion or flange 13a at the center which is freely received in chamber 18. Annular pockets 14 and 114 are formed on the opposed end surfaces of sleeves 11 and 12, respectively. Pocket 14 and 114 are communicated with a source of pressurized fluid indicated by a reference character P via fixed or non-adjustable orifices 16 and 116 respectively whereby the shaft 13 is prevented from being moved in the axial direction by the static pressure of the fluid contained in pockets 14 and 114.

Figure 2:
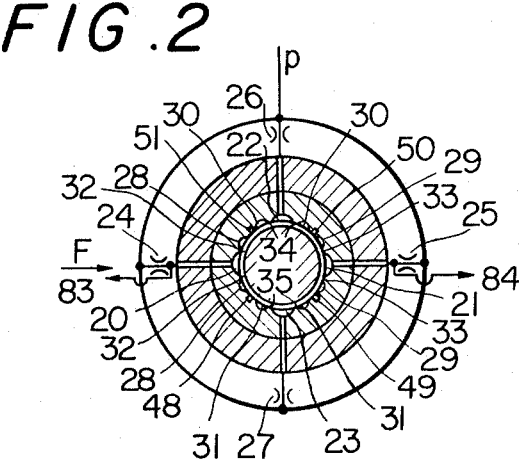
FIG. 2 shows a cross-section of the bearing taken along a line II—II in FIG. 1.
Figure 4:
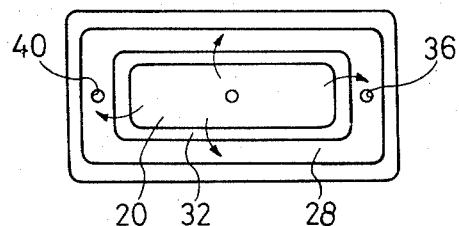
FIG. 4 is an enlarged developed view of a portion of the fluid bearing embodying the invention.

As shown in FIG. 2, the inner bore of lefthand sleeve 11 is formed with independent control pocket pairs 20, 21 and 22, 23 respectively in the direction of load F and in the direction perpendicular thereto. These control pockets 20 to 23 are communicated with the source of pressurized fluid P respectively through fixed orifices 24, 25, 26 and 27 to rotatably support shaft 13 by the fluid under pressure supplied thereto. As shown in FIG. 4, a detection pocket 28 is formed to surround control pocket 20, the detection pocket 28 being separated from control pocket 20 by a rectangular land 32. Similarly, another control pockets 21, 22 and 23 are also surrounded by detection pockets 29, 30 and 31 separated therefrom by rectangular lands 33 to 35, respectively. Consequently, control pockets 20 to 23 are communicated with detection pockes 28 to 31 respectively through the gaps between rectangular lands 32 to 35 and the peripheral surface of shaft 13. As shown in FIG. 4, a supply port 36 and a control port 40 are provided for detection pocket 28. Similarly, detection pockets 29 to 31 are provided with supply ports 37, 38 and 39 (only port 37 is shown in FIG. 1) and these supply ports 36 to 39 are communicated with the source of pressurized fluid P via fixed orifices 44 to 47 (orifices 46 and 47 are not shown). Further, detection pocket 29 is provided with a control port 41 which corresponds to the control port 40 of detection pocket 28. Axial discharge grooves 48, 49, 50 and 51 are formed on the inner surface of the sleeve 11 between adjacent pairs of detection pockets 28 to 31, the opposite ends of discharge grooves 48 to 51 being communicated with circumferential discharge grooves 52 and 53 formed on the inner surface of sleeve 11. The discharge grooves 52 and 53 are communicated with a reservoir 150, as diagrammatically shown in FIG. 1, so that the fluid under pressure supplied to the control pockets 20 to 23 and to the detection pockets 28 to 31 is drained to reservoir 150 through the gap between shaft 13 and sleeve 11 and through discharge grooves 52 and 53.

Like the lefthand sleeve 11, the righthand sleeve 12 is formed with control pockets 120 to 123 (pockets 122 and 123 are not shown), fixed orifices 124 to 127 (orifices 126 and 127 are not shown) connected between the control pockets 120 to 123 and the source of pressurized fluid, detection pockets 128 to 131 (pockets 130 and 131 are not shown) respectively surrounding control pockets 120 to 123, fixed orifices 144 to 147 (orifices 146 and 147 are not shown) connected between the detection pockets 128 to 131 and the source of pressurized fluid and discharge grooves 152 and 153.

Figure 3:
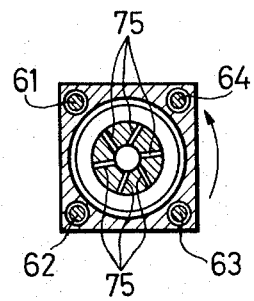
FIG. 3 shows a cross-section of a control valve taken along a line III—III in FIG. 1

Further, a control valve A is provided to be responsive to the pressure differential between the fluid pressures in detection pockets 28 and 29 which are created by the displacement of shaft 13 under load F for controlling the pressure differential between control pockets 20 and 21 and between detection pockets 28 and 29. Similar control valve B is provided to be responsive to the pressure differential between detection pockets 128 and 129 for controlling the pressure differential between control pockets 130 and 131 and that between detection pockets 128 and 129. Since control valves A and B have the same construction, that of control valve A will be described in detail hereunder, and the corresponding elements of both valves are designated by the same reference numerals. The cylinder 60 of the control valve comprises split clamped by means of bolts 61 to 64 (see FIG. 3) and contains a spool 65 which is disposed to be slidable in the axial direction and rotatable. The opposite ends of a central bore 66 in the spool 65 are sealed by caps 77 and 78. Flanges 69 formed at the center of spool 65 are received in an anular chamber 70 in cylinder 60 to be slidable a little in the axial direction and rotatable. Left and right inlet grooves 71 and 72 are formed on the surface of the bore of the cylinder 60 and spool 65 is provided with a plurality of inlet ports 73 and 74 for communicating inlet grooves 71 and 72 with bore 66 inside spool 65. As shown in FIG. 3, a plurality of inclined passages 75 are provided for the spool at a point intermediate flanges 69 for communicating annular chamber 70 with the axial bore 66 of spool 65, said passages 75 being contained in the same plane at right angles with respect to the axis of the spool and are inclined in the same direction with respect to the radius. Inlet grooves 71 and 72 are connected to the source of pressurized fluid P and annular chamber 70 is communicated with reservoir 150 through a discharge port 76. With this construction the pressurized fluid supplied to bore 66 through inlet grooves 71 and 72 and inlet ports 73 and 74 is discharged to the reservoir through inclined passages 75 and discharge port 76 so that the spool 65 is normally rotated in the direction indicated by an arrow shown in FIG. 3. Such rotation overcomes the viscosity of the fluid contained in the control valve and assures its quick and smooth axial movement.

Opposite ends of cylinder 60 of the control valve is closed by end plates 67 and 68 to form chambers 79 and 80 on the opposite ends of spool 65. Lefthand chamber 79 (in the case of control valve B, chamber 79 is located on the righthand side) is communicated with control port 41 of detecting pocket 29 via a fixed orifice 81 whereas the righthand chamber 80 is communicated with control port 40 of detection pocket 28 via a fixed orifice 82. On the opposite sides of annular chamber 70 are formed annular chambers 83 and 84. The effective area of annular chambers 83 and 84 is selected to be smaller than left-and righthand chambers 79 and 80. The gaps between side walls of annular chamber 70 and the side walls of flanges 79 act as variable orifices 85 and 86. Lefthand annular chamber 83 (in the case of control valve B annular chamber 83 is located on the righthand side) is communicated with control pocket 20 whereas righthand annular chamber 84 (in the case of control valve B, annular chamber 84 is located on the lefthand side) with control pocket 21 with the result that a portion of the pressurized fluid in control pockets 20 and 21 is discharged to reservoir 150 via annular chambers 83 and 84, variable orifices 85 and 86, inclined passages 75 and discharge port 76. Accordingly, the pressure in the control pockets 20 and 21 varies dependent upon the magnitude of the gap between the shaft and sleeve 11 and the degree of opening of variable orifices 85 and 86, thus varying the pressure in detection pockets 28 and 29 in accordance with the magnitude of the gap between shaft 13 and sleeve 11.

In the illustrated example, a grinding wheel 90 is mounted on the lefthand end of shaft 13 and a pulley 91 connected to a driving motor (not shown) through a belt is mounted on the righthand end.

The operation of the fluid bearing will be described with particular reference to the lefthand bearing sleeve.

When an upward load F is imposed upon grinding wheel 90 by a workpiece, not shown, the shaft 13 will be moved for a moment in the upward direction in the bearing, thus decreasing the upper gap while increasing the lower gap between the shaft and the bearing surface. In response to this small displacement of the shaft, the pressure in upper control pocket 21 and detection pocket 29 increases whereas the pressure in the lower control pocket 20 and detection pocket 28 decreases. The pressure differential between detection pockets 28 and 29 moves spool 65 of control valve to the right as viewed in FIG. 1 to decrease the opening of variable orifice 86 whereas to increase that of variable orifice 85 thus respectively decreasing and increasing the pressures in annular chambers 83 and 84. Consequently, the pressure in the upper control pocket 21 is increased further whereas that in the lower control pocket 20 is decreased further by the displacement of spool 65. The variation of the pressure in control pockets 20 and 21 caused by the displacement of spool 65 results in the pressure rise in detecting pocket 29 whereas in the decrease of the pressure in detection pocket 28 whereby to displace further spool 65. However, for the sake of simplicity of the effect of such small additional displacement will not be discribed.

As above described the pressure in the upper control pocket 21 and upper detection pocket 29 will be increased due to the displacements of shaft 13 and spool 65 while the pressure in the lower control pocket 21 and lower detection pocket 28 will be decreased due to the displacements of the shaft and spool, thereby quickly restoring shaft 13 to the center of the bearing against load F.

As the shaft is brought back to the center of the bearing against the load, the pressure differentials between control pockets 20 and 21 and between detection pockets 28 and 29 caused by the displacement of shaft 13 disappears. However, the pressure differentials caused by the displacement of the spool 65 of the control valve does not disappear, thereby to maintain the shaft at the center of the bearing against load F. The pressure differencial between the pressures in detection pockets 29 and 28 acts on the opposite sides of spoole 65 of control valve A to hold spool 65 at a balanced position where a pressure differential is established between annular chambers 83 and 84 corresponding to the first mentioned pressure differential.

As above described, in accordance with this invention, detection pockets are provided to respectively surround a plurality of control pockets, the pressure differential between opposed detection pockets is applied to the opposite ends of a control valve, and the pressure of the fluid supplied to the control pockets is varied in accordance with the pressure differential acting upon the control valve. Accordingly, when a load is applied to the shaft, a force resisting the load is quickly applied to the bearing surface in accordance with the pressure variations caused by the displacement of the shaft and by the operation of the control valve to bring back the shaft to the center of the bearing. Even after the shaft has been brought back to the center of the bearing, the pressure differential caused by the operation of the control valve remains in the detection pockets, thus improving the load carrying capacity of the bearing.

Although the invention has been shown and described in terms of a preferred embodiment thereof it will be clear that many changes and modifications may be made without departing from the true spirit and scope of the invention as defined in the appended claims.

We claim:

1. In a fluid bearing comprising a bearing member adapted to rotatably support a shaft by means of a thin fluid film which is formed by supplying fluid under pressure into a small gap between said shaft and said bearing member and a control valve including a cylinder and a spool slidably received in said cylinder for controlling the pressure of said fluid, the improvement which comprises a plurality of control pockets formed on the bearing surface of said bearing member, a plurality of detection pockets respectively surrounding said control pockets, means for supplying the fluid under a predetermined pressure for said control pockets and said detection pockets, means for connecting a pair of diametrically opposite detection pockets with the opposite ends of said control valve for operating said spool and means for connecting a pair of diametrically opposite control pockets respectively surrounded by said pair of diametrically opposite detection pockets with the output of said control valve whereby upon creation of a pressure differential between said pair of detection pockets due to application of a load on said shaft, the fluid pressure in one of the pair of control pockets is increased whereas the fluid pressure in the other control pocket is decreased, said control valve being balanced in accordance with the pressure differentials between said pair of detection pockets and between said pair of control pockets so that upon application of a load upon said shaft pressure differentials are created between said pair of control pockets and said pair of detection pockets for restoring said shaft to the center of the bearing against said load.

2. The improvement according to claim 1 wherein said control valve comprises: a cylinder, a hollow spool slidably received in the bore of said cylinder, and an annular chamber provided for said bore to surround said spool, said spool being provided with a plurality of inclined passages which are contained in a plane perpendicular to the axis of said spool and inclined in the same direction with respect to the radius thereof whereby the fluid flowing through said inclined passages creates a force for rotating said spool.

3. The improvement according to claim 2 wherein the opposite ends of said hollow spool are closed to define a pair of fluid chambers between the ends of said spool and the opposite ends of said cylinder, said pair of fluid chambers being subjected to a differential pressure to move axially said spool, fluid under pressure is supplied into said hollow spool and discharged through said inclined passages, and wherein said spool is provided with a flange projecting into said annular chamber with small clearances therebetween so as to form variable orifices between the side walls of said annular chamber and the side walls of said flange, said inclined passages being provided through said flange to open into said annular chamber.

4. A combination of a fluid bearing and a control valve, said bearing comprising at least one bearing sleeve adapted to rotatably support a shaft, the bearing surface of said sleeve being provided with at least one pair of diametrically opposite control pockets, means to supply fluid under pressure to said control pockets through fixed orifices, at least one pair of detection pockets respectively encircling said control pockets, said control pockets and said detection pockets being communicated with each other through small gaps between the periphery of said shaft and the bearing surface of said bearing sleeve; and said control valve comprising a cylinder and a hollow spool slidably received in the bore of said cylinder, the opposite ends of said hollow spool being closed to define fluid chambers between said opposite ends of said hollow spool and the opposite ends of said cylinder, means to communicate said fluid chambers with said diametrically opposite detection pockets so as to apply a pressure differential between said detection pockets on the opposite ends of said spool, a flange formed at the central outer portion of said spool, an annular chamber provided for said bore for loosely receiving said flange, means to supply fluid under pressure into said hollow spool, said flange being provided with a plurality of inclined passages which are contained in a common plane perpendicular to the axis of said spool and are inclined with respect to the radius so that said fluid under pressure flows through said inclined passages into said annular chamber to create a force tending to rotate said spool, the opposite sides of said flange being spaced a little from the opposite side walls of said annular chamber to define a pair of orifices therebetween, the degree of opening of said orifices being varied by the axial movement of said spool, and means for connecting said pair of orifices to said pair of control pockets.

* * * * *